United States Patent
Binks et al.

(10) Patent No.: US 6,395,339 B1
(45) Date of Patent: May 28, 2002

(54) DISPERSIONS AND PROCESS FOR MAKING THEM

(75) Inventors: Bernard P. Binks, East Yorkshire; Jinfeng Dong, Hull, both of (GB)

(73) Assignee: S. C. Johnson & Son, Inc., Racine, WI (US)

( * ) Notice: Subject to any disclaimer, the term of this patent is extended or adjusted under 35 U.S.C. 154(b) by 0 days.

(21) Appl. No.: 09/700,053

(22) PCT Filed: May 11, 1999

(86) PCT No.: PCT/US99/10281

§ 371 (c)(1),
(2), (4) Date: Jan. 5, 2001

(87) PCT Pub. No.: WO99/58596

PCT Pub. Date: Nov. 18, 1999

(30) Foreign Application Priority Data

May 11, 1998 (GB) .............................. 9810060

(51) Int. Cl.⁷ ................................. B05D 3/02
(52) U.S. Cl. ...................................... 427/387
(58) Field of Search ......................... 427/387

(56) References Cited

U.S. PATENT DOCUMENTS

| 3,956,174 A | 5/1976 | Palcher | 252/400 R |
| 4,133,921 A | 1/1979 | Palcher | 427/355 |
| 5,017,221 A | 5/1991 | Legrow et al. | 106/2 |
| 5,556,628 A | 9/1996 | Derian et al. | 424/401 |

FOREIGN PATENT DOCUMENTS

| CS | 269695 B3 * | 4/1990 |
| EP | 0 489 582 A1 | 6/1992 |
| JP | 57029681 | 2/1982 |
| JP | 09-157691 A2 * | 6/1997 |

OTHER PUBLICATIONS

Bergeron et al, Colloids Surf., 122(1–3), pp 103–120, 1997.*

Binks et al, Phys. Chem. Chem. Phys., 1(9), pp 2335–2344, 1999.*

* cited by examiner

*Primary Examiner*—Emma Cameron

(57) ABSTRACT

The present invention relates to an aqueous dispersion of silicon compounds and to a process for making them and methods of treating a surface using them. The dispersions have water, a separate liquid phase of an incompatible silicone, and an anionic surfactant. The water contains a stabilizing amount of a dissolved electrolyte, and the dispersion contains an effective amount of stabilizing anionic surfactants.

18 Claims, No Drawings

DISPERSIONS AND PROCESS FOR MAKING THEM

TECHNICAL FIELD

The present invention relates to dispersions of silicon compounds and to a process for making them.

BACKGROUND ART

Ordinary emulsions contain dispersed drops in the micrometer range and are unstable over time, although the shelf life may be adequate for most purposes. They are inherently turbid. However, the amount of scattered light is dependent on the difference in refractive index between the dispersed phase and the continuous phase. It is possible to obtain transparent emulsions by selecting materials whose refractive indices match. However, materials which may be useful components of liquid products containing a dispersed phase may have refractive indices which are sufficiently different from one another that a non-turbid dispersion is not obtained in a conventional emulsion.

Micro-emulsions contain a dispersed phase with a droplet size of the order of nanometers, as opposed to the micrometers of conventional emulsions. They are stable indefinitely and are not turbid even if the refractive indices of the dispersed phase and the continued phase do not match. They form spontaneously on mixing the components but it is difficult to predict the combination of water-insoluble components (oil phase) and surfactant required to prepare them.

Aqueous emulsions containing polydimethyl siloxanes (PDMS) may be used for various purposes. Thus U.S. Pat. No. 5,017,221 discloses that aqueous emulsions of polydimethyl siloxane fluids (i.e. PDMS) have been used as a protective coating on many surfaces including rubber, vinyl, plastic, leather, and sealed wood, and refers to U.S. Pat. Nos. 3,956,174 and 4,133,921 as showing such compositions.

It would be desirable to be able to prepare aqueous dispersions containing water-immiscible silicone liquids, e.g. polydimethyl silicone, with improved transparency and stability. It is particularly desirable to produce aqueous dispersions with improved transparency and stability which contain significant amounts of silicone liquids. However, dispersions prepared from polydimethyl silicone, water, and an anionic surfactant are generally turbid.

DISCLOSURE OF INVENTION

According to the present invention an aqueous dispersion comprising water, a separate liquid phase of an incompatible silicone, and an anionic surfactant is characterized in that (a) the water contains a stabilizing amount of a dissolved electrolyte, and (b) the dispersion contains an effective amount of a stabilizing anionic surfactant.

According to a further aspect of the present invention, a process for forming an aqueous dispersion comprising water, a separate liquid phase of an incompatible silicone and a surfactant is characterized by the steps of: (a) forming an aqueous phase containing a stabilizing amount of a dissolved electrolyte, (b) introducing an effective amount of a stabilizing anionic surfactant into the aqueous phase containing dissolved electrolyte, and (c) bringing liquid incompatible silicone into contact with the aqueous phase containing surfactant and electrolyte.

According to a still further aspect of the present invention a process for forming an aqueous dispersion comprising a separate continuous liquid phase of an incompatible silicone, water dispersed within the silicone, and a surfactant is characterized by the steps of: (a) forming an aqueous phase containing a stabilizing amount of a dissolved electrolyte, (b) forming a silicone oil phase containing an effective amount of a stabilizing anionic surfactant, and (c) introducing the aqueous phase into the liquid incompatible silicone with agitation.

According to yet another aspect of the present invention, a method of treating a surface by applying to the surface an aqueous dispersion containing a dispersed liquid silicone phase is characterized in that (a) the water contains a stabilizing amount of a dissolved electrolyte, and (b) the dispersion contains an effective amount of a stabilizing anionic surfactant.

We have found that in order to have a possibility of obtaining a dispersion of increased stability when using an anionic surfactant, it is necessary to use water containing sufficient dissolved electrolyte instead of pure water. Not all anionic surfactants will give improved stability even in the presence of dissolved electrolyte, and it is necessary to select specific anionic surfactants from the general class of anionic surfactants. However, the skilled person who has understood the inventive idea disclosed by the present specification, namely that it is necessary to use water containing a dissolved electrolyte and then to select a suitable anionic surfactant, will be able to identify suitable anionic surfactants by simple non-inventive tests.

When reference is made in this specification to improve stability, the improvement is determined by comparison with the corresponding composition containing pure water without dissolved electrolyte. Improved stability is most readily indicated by improved clarity of the dispersion, which may also have a blue tinge. It will be understood that the dispersion must remain as a dispersion. The separation of a turbid dispersion into two clear layers does not represent an improvement in stability.

Improved stability may also be indicated by improved storage life (often referred to as "shelf life") before the dispersion separates into its components. However, as many conventional emulsions have relatively long storage lives, it may not be practicable to use storage life as a routine measure of stability.

It is believed that the present invention makes possible the preparation of dispersions which are true microemulsions. In such cases instrumental determination of the droplet size of the dispersed phase may be used to give a more precise indication of the improvement given by the present invention.

An "incompatible" silicone is one which does not disperse in water in the absence of a separate surfactant, as is explained in more detail below. It may be desirable to use water which is substantially free of ions as the basis of the dispersion so as to be able to control the nature of the electrolyte more closely, and to avoid the formation of insoluble salts. In particular the presence of significant amounts of divalent ions is undesirable.

Where the dispersions according to the invention are oil-in-water dispersions (i.e. water is the continuous phase), then the proportion of water in the composition may be for example greater than 85% by weight of total composition, e.g. 85% to 98%, preferably 85% to 90%.

The electrolyte is preferably selected so as to give a substantially neutral aqueous phase e.g. pH 6–8. It will be apparent that the electrolyte must not adversely affect the anionic surfactant, e.g. by causing it to form an insoluble salt or to hydrolyze. As indicated above, the presence of divalent ions, e.g. ions of Ca or Mg, will be undesirable. An example of a suitable electrolyte is NaCl.

The concentration of the electrolyte may be for example in the range 0.01 to 0.1M, if the object is to produce oil-in-water dispersions. Higher concentrations of electrolyte may be used with larger amounts of silicone oil to produce water-in-oil dispersions.

The use of a relatively low concentration of electrolyte favours the production of oil-in-water dispersions, while higher concentrations favour the production of water-in-oil dispersions. The optimum concentration of electrolyte will depend on the specific electrolyte used, but can be determined by simple tests.

The dispersion of the present invention comprises a separate liquid phase of an incompatible silicone. The term "silicone" indicates an organic compound of silicon containing Si—O repeating units with the silicon atom carrying two organic groups; preferably the organic groups are methyl groups. Some liquid silicone compounds, e.g. certain copolymers containing alkylene oxide groups, act as surfactants so that they will disperse in water without the need to use a separate surfactant. Such self-dispersing silicones are not incompatible silicones as required by the present invention. The silicone compound is preferably one having a substantially linear chain of Si—O units.

The silicone liquid may consist substantially only of linear polydimethyl siloxane (PDMS), together with such quantities of low molecular weight cyclic dimethylsiloxanes as may be present in commercially available PDMS. The PDMS is preferably a linear polymer and preferably has a viscosity in the range 0.5 to 100 cS (centistokes) at 25° C., more preferably 0.5 cS to 50 cS, most preferably 0.5 to 5 cS.

The proportion of silicone in the dispersion is preferably in the range 0.1 to 10% by weight of the total dispersion (for oil-in-water dispersions).

The preferred anionic surfactants are salts of diesters of sulfosuccinic acid. The sulfonate group provides a hydrophilic portion and the hydrophobic portion is provided by the groups linked to the carboxylic group to form the ester. Preferably both the hydrophobic groups have a branched carbon chain, and are preferably alkyl groups, unsubstituted by other groups or elements.

An example of a specific surfactant which may be used in the present invention is a bis(2-ethylhexyl) sulfosuccinate, which is commercially available as the sodium salt under the trade name "Aerosol OT".

The anionic surfactant if it comprises more than one surfactant preferably comprises only a single type of anionic surfactant, e.g. only bis alkyl sulfosuccinate salts. The present invention enable stable dispersions to be produced without the use of a co-surfactant. Preferably, the surfactant is a single surfactant with the only other components introduced with the surfactant being those inherently present in commercial materials as a consequence of the manufacturing process.

The concentration of surfactant used may, for example, be in the range of 5 to 100 mM in water.

The temperature of the dispersion may vary, for example between 10° and 60° C., and is preferably in the range 20° to 40° C. The dispersion may be formed by bringing the silicone oil into contact with a solution of the surfactant in water containing the electrolyte and subjecting the mixture to gentle agitation. The dispersion may in some cases form spontaneously with minimum agitation.

MODES OF CARRYING OUT THE INVENTION

Two different methods were used to prepare the silicone oil-in-water dispersions.

Method I (Single Phase Solubilization)

An aqueous solution of the anionic surfactant was prepared in electrolyte (according to the invention) or in water (comparative test), and the silicone oil was titrated into this solution slowly stirring the contents of the vessel while maintaining them at a constant temperature. A glass cell was used for the titration containing a side-arm and a rubber suba seal through which the oil was added via a microsyringe.

Sufficient time was allowed between additions for the oil to become solubilized in the surfactant aggregates which had formed in the surfactant solution. The maximum extent of solubilization was taken as the point at which a permanent turbidity remained or small oil droplets were seen resting on the aqueous solution surface.

Method II (Multiphase Solubilization)

In this method, equal volumes of oil and aqueous surfactant solution, either with electrolyte (according to the invention) or without electrolyte (comparative test), were introduced into a sealed glass vessel and mixed gently by inverting the sealed glass vessel and left to equilibrate at fixed temperature for at least two weeks. The contents of the vessel separated into an upper clear oil layer and a lower, clear (sometimes blueish) aqueous layer. The lower layer contains the oil-in-water dispersion.

Comparative Test A

An experiment was carried out using the procedure of Method I. The surfactant was a commercially available product sold under the trade name "Aerosol OT" (the sodium salt of bis(2-ethylhexyl)sulfosuccinate) and was greater than 99% pure. The silicone oil was a commercially available polydimethyl siloxane fluid having a viscosity of 0.65 cS. A 3 mM solution of surfactant was prepared in water which did not contain electrolyte. The experiment was carried out at 25° C. the maximum amount of silicone oil which could be introduced without producing a turbid dispersion corresponded to an R value of 0.5, where R is the mole ratio of oil to surfactant in the aqueous dispersion. The molecular weight of the silicone oil as given by the supplier was 164.

EXAMPLES 1–2

An experiment was carried out as in comparative Test A but with the surfactant dissolved in water containing NaCl at a concentration of 0.05M (Example 1) or 0.075M (Example 2). The maximum amounts of silicone oil at which a stable dispersion ceased to be formed corresponded to R values of 1.25 (Example 1) and around 2 (Example 2).

EXAMPLE 3

An experiment was carried out as in comparative Test A but using a 40 mM solution of surfactant containing NaCl at a concentration of 0.09M, and a temperature of 40° C. The maximum R value was around 6.

EXAMPLE 4

An experiment was carried out as in Example 3 except that the temperature was 60° C. The maximum R value was 3.5.

Comparative Test B

An experiment was carried out as in Comparative Test A except that the surfactant concentration in the surfactant was 40 mM surfactant, and the temperature was 30° C. the maximum R value was 1.

EXAMPLES 5–6

Experiments were carried out as in Comparative Test B except that the surfactant solution contained NaCl at concentrations of 0.03M (Example 5) and 0.06 (M NaCl (Example 6). The maximum R values were 2.2 and 4 respectively.

Method I as described above has been used to make oil-in-water dispersions. It may be modified so as to produce water-in-oil dispersions when high electrolyte concentrations are used and the surfactant is sufficiently soluble in oil. Method Ia The procedure is the same as Method I except that a solution of the anionic surfactant was prepared in silicone oil and an electrolyte comprising dissolved salt in water was titrated into the solution. The maximum extent of solubilization was taken as the point at which permanent turbidity remained.

EXAMPLE 7

An experiment was carried out using Method Ia. The surfactant was that used in comparative Test A and as dissolved in the same commercial silicone oil (viscosity 0.65 cS) (PDMS) as was used in comparative Test A to give a clear solution with a concentration of 40 mM in PDMS. The water titrated into the solution of surfactant in oil contained NaCl at a concentration of 0.1M. The procedure was carried out at a temperature of 25° C. The maximum amount of aqueous electrolyte which could be introduced was 53 where R is the mole ratio of water to surfactant in the water-in-oil dispersion.

EXAMPLE 8

An experiment was carried out as in Example 7 but using a 0.2M aqueous solution of NaCl and a temperature of 40° C. The corresponding R value was 48.

Method II can also be used to make water-in-oil dispersions. The only modification required is to use a sufficiently high concentration of electrolyte as the aqueous phase. The clear dispersion will then form in the upper oil layer instead of the lower aqueous layer.

INDUSTRIAL APPLICABILITY

The dispersions of the present invention are particularly useful as cleaners for glass and other hard surfaces. They may be used to deposit a layer of incompatible silicone as a layer on the surface to provide resistance to further soiling. They may be applied as a spray and subsequently a layer of dispersion may be spread across the surface by a spreading means, which may be a rubber blade, or a cloth. The surface may be allowed to dry by evaporation of the water or the surface may be wiped dry with absorbent materials.

The process for making the dispersions may be carried out using conventional manufacturing equipment and commercially available raw materials.

What is claimed is:

1. An aqueous dispersion comprising water having a stabilizing amount of a dissolved electrolyte, the water being essentially free of divalent cations; a separate liquid phase of an incompatible silicone; and an effective amount of stabilizing anionic surfactant, wherein surfactant in the dispersion is essentially only anionic surfactant.

2. The dispersion according to claim 1 wherein the silicone has a viscosity in the range 0.5 to 100 centistokes at 25° C.

3. The dispersion according to claim 2 having a pH in the range 6 to 8.

4. The dispersion according to claim 2 wherein the dispersion is an oil-in-water dispersion.

5. The dispersion according to claim 2 wherein the concentration of the electrolyte is in the range 0.01 to 0.1 molar.

6. The dispersion according to claim 2 wherein the incompatible silicone consists essentially only of a linear poly(dimethyl) silicone.

7. The dispersion according to claim 6 wherein the silicone has a viscosity in the range 0.5 to 50 centistokes at 25° C.

8. The dispersion according to claim 2 wherein the silicone is present in an amount from 0.1 to 10% by weight, based on total weight of the dispersion.

9. The dispersion according to claim 1 wherein the anionic surfactant is a salt of a diester of sulfosuccinic acid.

10. The dispersion according to claim 9 wherein the anionic surfactant contains a hydrophobic group comprising a branched carbon chain that is linked to each carboxylate group to form the diester.

11. The dispersion according to claim 2 wherein the concentration of anionic surfactant is in the range 5 to 100 mM in water.

12. A method of treating a surface by applying to the surface an aqueous dispersion according to claim 1.

13. The method according to claim 12 wherein a layer of the dispersion is applied to the surface, and the surface is then dried.

14. A process for forming an aqueous dispersion comprising water, a separate liquid phase of an incompatible silicone and a surfactant, the process comprising:

(a) forming an aqueous phase by mixing water with a stabilizing amount of a dissolved electrolyte, the water being essentially free of divalent cations;

(b) introducing an effective amount of a stabilizing anionic surfactant into the aqueous phase; and (c) bringing liquid incompatible silicone into contact with the aqueous phase;

(d) wherein surfactant in the dispersion is essentially only anionic surfactant.

15. A process for forming an aqueous dispersion comprising a separate continuous liquid phase of an incompatible silicone, water dispersed within the silicone, and a surfactant, the process comprising:

(a) forming an aqueous phase by mixing water with a stabilizing amount of a dissolved electrolyte, the water being essentially free of divalent cations;

(b) forming a silicone oil phase by mixing an incompatible silicone and an effective amount of a stabilizing anionic surfactant, and (c) introducing the aqueous phase into the silicone oil phase with agitation;

(d) wherein surfactant in the dispersion is essentially only anionic surfactant.

16. The method according to claim 12 wherein the silicone has a viscosity in the range 0.5 to 100 centistokes at 25° C.

17. The method according to claim 14 wherein the silicone has a viscosity in the range 0.5 to 100 centistokes at 25° C.

18. The method according to claim 15 wherein the silicone has a viscosity in the range 0.5 to 100 centistokes at 25° C.

* * * * *